US006625746B1

(12) United States Patent
Moore

(10) Patent No.: US 6,625,746 B1
(45) Date of Patent: Sep. 23, 2003

(54) MICROPROCESSOR INSTRUCTION BUFFER REDUNDANCY SCHEME

(75) Inventor: Charles Roberts Moore, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 09/594,632

(22) Filed: Jun. 15, 2000

(51) Int. Cl.[7] ................................................ G06F 11/00
(52) U.S. Cl. ............................ 714/6; 714/5; 712/205; 712/227
(58) Field of Search ..................... 714/6, 5, 42, 718; 712/205, 227; 711/108

(56) References Cited

U.S. PATENT DOCUMENTS

| | | | | |
|---|---|---|---|---|
| 4,691,279 A | * | 9/1987 | Danilenko et al. | 711/108 |
| 4,791,560 A | * | 12/1988 | Lahti et al. | 712/242 |
| 4,805,093 A | * | 2/1989 | Ward | 711/108 |
| 5,574,875 A | * | 11/1996 | Stansfield et al. | 711/3 |
| 5,621,739 A | * | 4/1997 | Sine et al. | 714/724 |
| 5,819,308 A | * | 10/1998 | Tien et al. | 711/108 |
| 5,881,265 A | * | 3/1999 | McFarland et al. | 712/218 |
| 6,122,444 A | * | 9/2000 | Shen et al. | 710/52 |
| 6,470,443 B1 | * | 10/2002 | Emer et al. | 712/205 |
| 6,539,469 B1 | * | 3/2003 | Pan | 712/205 |
| 6,550,034 B1 | * | 4/2003 | Riedlinger et al. | 714/733 |

* cited by examiner

Primary Examiner—Robert Beausoliel
Assistant Examiner—Yolanda L. Wilson
(74) Attorney, Agent, or Firm—Mark E. McBurney

(57) ABSTRACT

The present invention is a mechanism for providing redundancy in the instruction buffer of a microprocessor such individual entries which test bad during manufacturing can be tolerated and the baseline specification of the microprocessor can be met. The present invention utilizes the instruction allocation logic of a microprocessor to allow additional buffer entries, above those called for in the specification to be provided. More particularly, each buffer entry is tested and the results are used to identify which individual entry or entries have a defective operational status. This information is then used to update the instruction allocation logic such that functional entries are considered for allocation, while those entries that test bad can be avoided. Further, the test status information can be used to set a "manufactured good" bit in the entry itself. This bit is then read ultimately by the allocation logic and instructions can be allocated accordingly, i.e. only to those entries which have tested good.

39 Claims, 6 Drawing Sheets

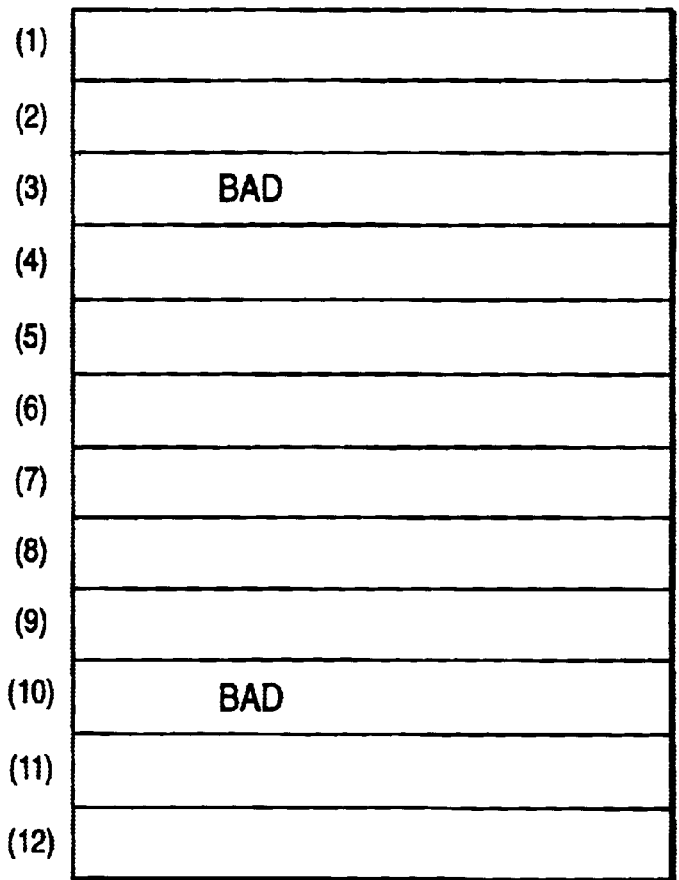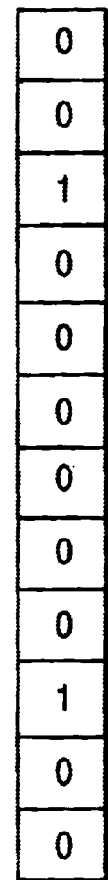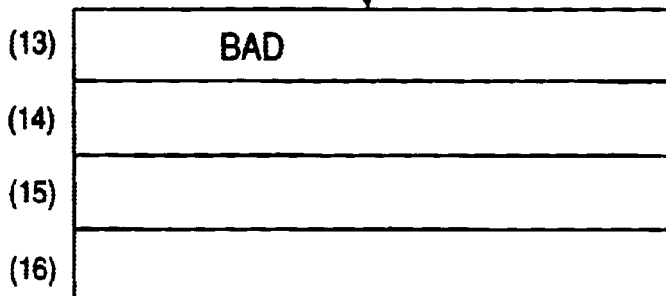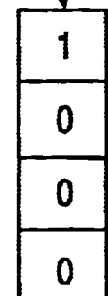
FIG. 5

MICROPROCESSOR INSTRUCTION BUFFER REDUNDANCY SCHEME

CROSS REFERENCE TO RELATED APPLICATIONS

U.S. patent application entitled "Register File Redundancy Scheme for Microprocessor with Renamed Registers", having Ser. No. 09/594,627, filed on Jul. 15, 2000, and assigned to the assignee of the present invention.

BACKGROUND OF THE INVENTION

1. Field of the Invention

The present invention relates to improving manufacturing yield for microprocessor chips by providing redundant, or spare instruction buffer entries and accurately identifying those entries which are available for use. More particularly, the present invention includes a technique that tests the instruction buffer circuitry and stores the results of these tests in order to ensure that a sufficient number of buffer entries are available to meet the baseline specification of the microprocessor.

2. Description of Related Art

With the continual advance of computer technology, more and more circuitry is being provided on each integrated circuit (IC), which makes them correspondingly more complex. These chips are likely to include millions of transistors and be quite large. It is not surprising that the cost to fabricate these ICs is relatively high and, as the cost increases, the manufacturing yield becomes critical in order for producers of these chips to remain competitive.

Manufacturing yield is essentially the percentage of ICs that meet the design specification relative to the total number of chips produced. Of course, as chip complexity and size increases, the manufacturing yield usually decreases. Further, after a new IC design has been manufactured for a significant period of time, per chip costs often decrease as the fabrication process is tuned and optimized. Thus, in order to stay competitive it is often necessary, if not critical, to increase manufacturing yields especially during the early stages of chip production when the manufacturing costs are highest.

It can be seen that yield on large chips is an important issue and techniques for tolerating small numbers of random defects in the manufacturing process are increasingly more important. While redundancy in caches has been used for some time, it has not been used for other structures in microprocessors. In particular, redundancy has not been used in the microprocessor register file circuitry that is common in microprocessors and whose area contribution in terms of chip real estate is growing. More particularly, the contribution of the register file and instruction buffer to the overall core area of modern microprocessors is increasing to the point where both of these structures can make up approximately ten percent (10%) of the microprocessor core for a total of about 20% of the core area and core functionality. This illustrates the importance in terms of complexity and size of just two microprocessor core structures where redundancy can be used in accordance with the present invention to improve performance.

Modern microprocessors capable of out-of-order execution make use of large numbers of dataflow-oriented instruction buffers for holding instructions while their operands develop. The instruction buffers accept new instructions from the dispatch logic, and coordinate the issue of instructions to various execution units based on operand availability, instruction age and other mechanisms. Typically, these instruction buffers contain content addressable memory (CAM) oriented circuitry that detects when required operand values are available, and either captures a copy of the operand data or sets a flag to indicate that the data is not available in subsequent stages of the execution pipeline (i.e. in a register file that will be accessed as the instruction is allowed to progress).

In general, as instructions are provided to the instruction buffer, they are allocated into unused entries. That is, each entry is the same as every other entry such that a particular instruction can be allocated to any entry in the instruction buffer. However, sometimes, due to limitations in the instruction issue policy, it may be advantageous to allocate new instructions into unused entries that are as close to the "physical bottom" of the instruction buffer stack as possible. Typically, the instruction buffers are "self allocating", i.e. the instruction is presented to the group of instruction buffer entries and the dataflow-oriented logic surrounding the entries automatically coordinates which of the available entries will receive the instruction. Further, instructions leave the instruction buffer as their dependencies are resolved (independent of their position in the buffer or age) and are "issued" to an execution unit (actually, it is common practice to allow them to linger in the instruction buffer entry for a fixed number of cycles beyond the issue point so that if the instruction is "rejected", it can easily be reissued without having to be re-fetched and re-dispatched).

Dataflow instruction processing as used herein refers to a microprocessor technology wherein resolution of the dependencies associated with the instruction being executed occurs in a continuous manner with a reduced need for pipeline stages, as commonly used in microprocessor technologies. Generally, logic is provided which corresponds to an individual instruction being processed, rather than a functional pipeline stage. In other words, instruction processing focuses more on the individual instruction than a particular pipeline stage. Of course, it should be noted that the scope of the present invention contemplates all types of microprocessors, microcontrollers, embedded controllers, digital signal processors and the like including those having distinct pipeline stages.

In a microprocessor with renamed registers, the machine automatically maps the architecturally defined set of "logical registers" into a larger set of "physical registers" to avoid various types of false dependencies and to allow easy purging or speculative results when necessary. As instructions are processed and registers are needed, register allocation/deallocation logic examines the state of the physical register pool, and selects a register that is currently not active, and then marks it as "in use". Later, when the instruction is either completed (or purged), the register deallocation logic frees the register again for future use.

More particularly, most modern microprocessors use rename buffers, or registers. It should be noted that the terms "rename registers" and "rename buffers" will be used interchangeably herein. These rename buffers act as temporary storage for instructions that have not completed and as write-back buffers for those that have. To avoid contention for a given register location rename registers are provided for storing instruction results before they are completed and committed to the architected registers. For example, a certain microprocessor may include thirty-two, thirty-two bit general purpose registers (GPRs) which are considered architected registers and twelve, thirty-two bit rename registers for holding results prior to their commitment to the architected registers. Further, rename registers may also be provided for other architected registers, such as two rename buffers for the floating point registers (FPR) and eight rename registers for the condition register (CR).

Generally, when the dispatch unit provides an instruction to the appropriate execution unit (i.e. the integer unit (IU), floating point unit (FPU), load/store unit (L/S), or the like), it allocates a rename register for the results of that instruction. The dispatch unit also provides a tag to the execution unit identifying the result that should be used as the operand. When the proper result is returned to the rename buffer it is provided to the execution unit, which begins execution of the instruction. Instruction results are not transferred from the rename registers to the architected registers until any speculative branch conditions are resolved and the instruction itself is retired without exceptions. If a speculatively executed branch is found to have been incorrectly predicted, the speculatively executed instructions following the branch are flushed and the results of those instructions are flushed from the rename registers.

As an example, conventional microprocessors avoid contention for a given register file location and in the course of out-of-order execution, by providing rename registers for the storage of instruction results prior to their commitment (in program order) by the completion unit to the architecturally defined registers. Register renaming minimizes architectural resource dependencies, namely the output and anti dependencies, that would otherwise limit opportunities for out-of-order execution.

A GPR rename buffer entry is allocated when an instruction that modifies a GPR is dispatched. This entry is marked as allocated but not valid. When the instruction executes, it writes its results to the entry and sets the valid bit. When the instruction completes, its result is copied from the rename buffer entry to the GPR and the entry is freed for reallocation. For load with update instructions that modify two GPRs, one for load data and another for address, two rename buffer entries are allocated.

An instruction that modifies a GPR is assigned one of the twelve positions in the GPR rename buffer. Load with update instructions get two positions since they update two registers. When the GPR rename buffer is full, the dispatch unit stalls when it encounters the first instructions that need an entry. A rename buffer entry becomes available in one cycle after the result is written to the GPR.

Operation of rename buffers associated with other register files such as the floating point register file, condition register file and the like function in a similar manner.

Redundancy and sparing are methods that are known in the art. These techniques supply additional circuit elements, beyond those required for the baseline specification of the IC, to act as spares in the event that certain ones of the original elements prove to be defective.

The use of redundancy in caches has been common for some time, but due to complexity and cycle time considerations has not been used for other structures in microprocessors. The present invention relates to providing redundancy in the instruction buffer file circuitry which, due in part to the data flow oriented trend, is becoming a larger portion of the microprocessor core in terms of physical area and importance.

Typically, with cache redundancy, fuses are provided that are associated with each cache line. As the cache is tested, those fuses associated with lines that test bad can be blown, or opened, and the array access decoder circuitry is modified to note the state of these fuses. The decoder circuitry then "decodes around" any bad entries by recognizing an address to a bad cache line and substituting a functional cache line, while maintaining a record of this substitution. The problem with this traditional scheme is that a significant amount of complexity is required in the cache array circuitry provide the address substitution and tracking mechanism. This is undesirable not only in the amount of additional logic circuitry that is required to be implemented in the chip, but also in the amount of cycle time that is required. More particularly, each time the processor tries to access the portion of the cache that tested bad, decode logic must identify the request as being to the bad address and provide a substitute address to a spare cache location where the data can be stored. This decoding and address substitution occurs continuously during the operation of the data processing system. Thus, it can be seen that a significant amount of cycle time can be consumed over and over during system operations as access attempts to bad cache locations are continually processed.

In a microprocessor core, the instruction buffer circuitry is usually considered a critical path, which is very sensitive to cycle time pressure. Thus, the conventional cache redundancy decode scheme cannot be applied to an instruction buffer circuitry environment to solve the problem addressed by the present invention which provides redundant instruction buffer entries without adding complexity or negatively impacting cycle time.

Therefore, it can be seen that a need exists for a mechanism that allows redundant microprocessor instruction buffer entries to allow the baseline specification to be met, even when some of the entries may not be functional, and to allow the control of these entries without adding additional complexity or cycle time pressures to the system.

SUMMARY OF THE INVENTION

In contrast to the prior art, the present invention is a mechanism for providing redundancy in the instruction buffer of a microprocessor such that entries which test bad during manufacturing can be tolerated and the baseline specification of the microprocessor can be met.

Broadly, the present invention utilizes the ability of a content addressable memory (CAM) to individually access the entries in a microprocessor instruction buffer to allow additional entries, beyond those called for in the specification to be provided. The entries are tested and those found "bad" are identified and avoided by updating instruction allocation logic with a list of the test status of each entry, or setting a "manufactured good" bit in the entry itself.

The present invention involves a modification to the instruction buffer allocation function (which can either be discrete logic outside the buffer, or dataflow-oriented logic built directly into the buffer ("manufactured good bit"). The modification allows the allocation function to note that one or more entries are "physically bad" and cannot be used for any instruction. One way of providing this information to the allocation function is by a list corresponding to the state of a set of fuses that can be set during the manufacturing test process which essentially involves running a set of test patterns that identify which instruction buffer entries are bad and blowing the fuses associated with those entries. A corresponding bit in a scannable latch is then set such that a bit vector having an indicator of the tested state of each instruction buffer entry can then be generated and used to update the instruction allocation logic to prevent any instruction from be provided to a defective instruction buffer entry. Other testing schemes may also be used to build the list of buffer entries, such as power on self test (POST), built in self test (BIST), or the like. In accordance with the present invention, the instruction buffer would be built with more physical entries than required by the design specification of the microprocessor so that, if needed, several buffer entries can be used as spares without affecting the end product performance.

Furthermore, the present invention contemplates a "manufactured good" bit (M) in each entry in the instruction buffer. Each of the entries also includes a "valid" bit (V) which informs the microprocessor when the entry is valid, i.e. available for use because the instruction previously in that entry has been processed (executed, flushed or the like). When an instruction is fetched from the cache and ready for placement in the instruction buffer control logic will check the "valid bit" and the "manufactured good" of the entries in the buffer and when both bits indicate that the entry has tested as being operational (M bit) and ready to accept a new instruction (V bit), then the instruction is placed by allocation logic in an available buffer entry The present invention uses existing instruction allocation functionality to prevent an instruction buffer entry that was manufactured bad to ever be included in a list of entries that are available to receive microprocessor instructions. In this manner redundant or spare entries, above the baseline specification of the microprocessor, can be provided to account for any faulty buffer entries that are present due to a less than 100% instruction buffer manufacturing yield. By using existing logic to prevent those entries that test bad from ever being used, an instruction buffer having sufficient entries to meet the microprocessor specification is ensured, without the adding costly and complex control logic, or requiring sorting of the chips to find those which happen to have been manufactured with instruction buffer entries that comply with the specification.

Therefore, in accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 5 is a diagram showing the relationship of the status of instruction buffer entries and bit vector fields in a first preferred embodiment of the present invention;

DETAILED DESCRIPTION OF THE PREFERRED EMBODIMENTS

Figure 1:
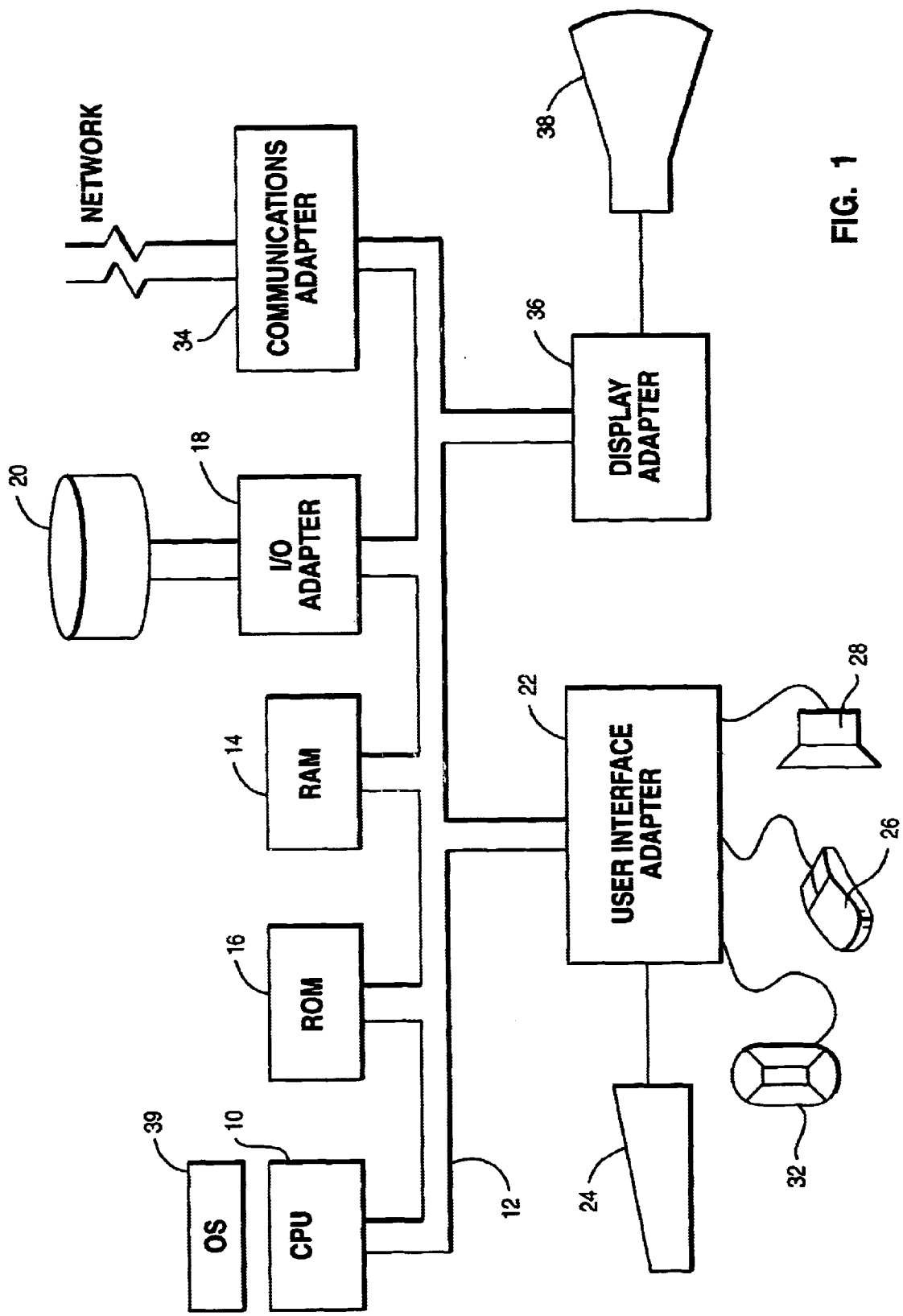
FIG. 1 is a block diagram of an overall computer system that may include a microprocessor capable of implementing the instruction buffer entry redundancy scheme of the present invention.

Referring to FIG. 1, a typical data processing system is shown which may be used in conjunction with the present invention. A central processing unit (CPU) 10 may include a PowerPC microprocessor, commercially available from the IBM Corporation or a Pentium class microprocessor, available from Intel Corporation interconnected to the various other system components by a system bus 12. Read only memory (ROM) 16 is connected to CPU 10 via bus 12 and includes the basic input/output system (BIOS) that controls the basic computer functions. Random access memory (RAM) 14, I/O adapter 18 and communication adapter 34 are also connected to system bus 12. I/O adapter 18 may be a small computer system interface (SCSI) adapter that communicates with a disk storage device 20. Communications adapter 34 may be a network card that interconnects bus 12 with an outside network. Adapter 34 may also include an I/O port that allows a connection to be made, through a modem 40, or the like to enable the data processing system to communicate with other such systems via the Internet, or other communications network (LAN, WAN). User input/output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through keyboard 24, trackball 32 or mouse 26 and receiving output from the system via speaker 28 and display 38. Additionally, an operating system (OS) 39, such as the DOS, OS/2, Windows operating system, or the like is shown running on CPU 10 and used to coordinate the functions of the various components shown in FIG. 1.

Figure 2:
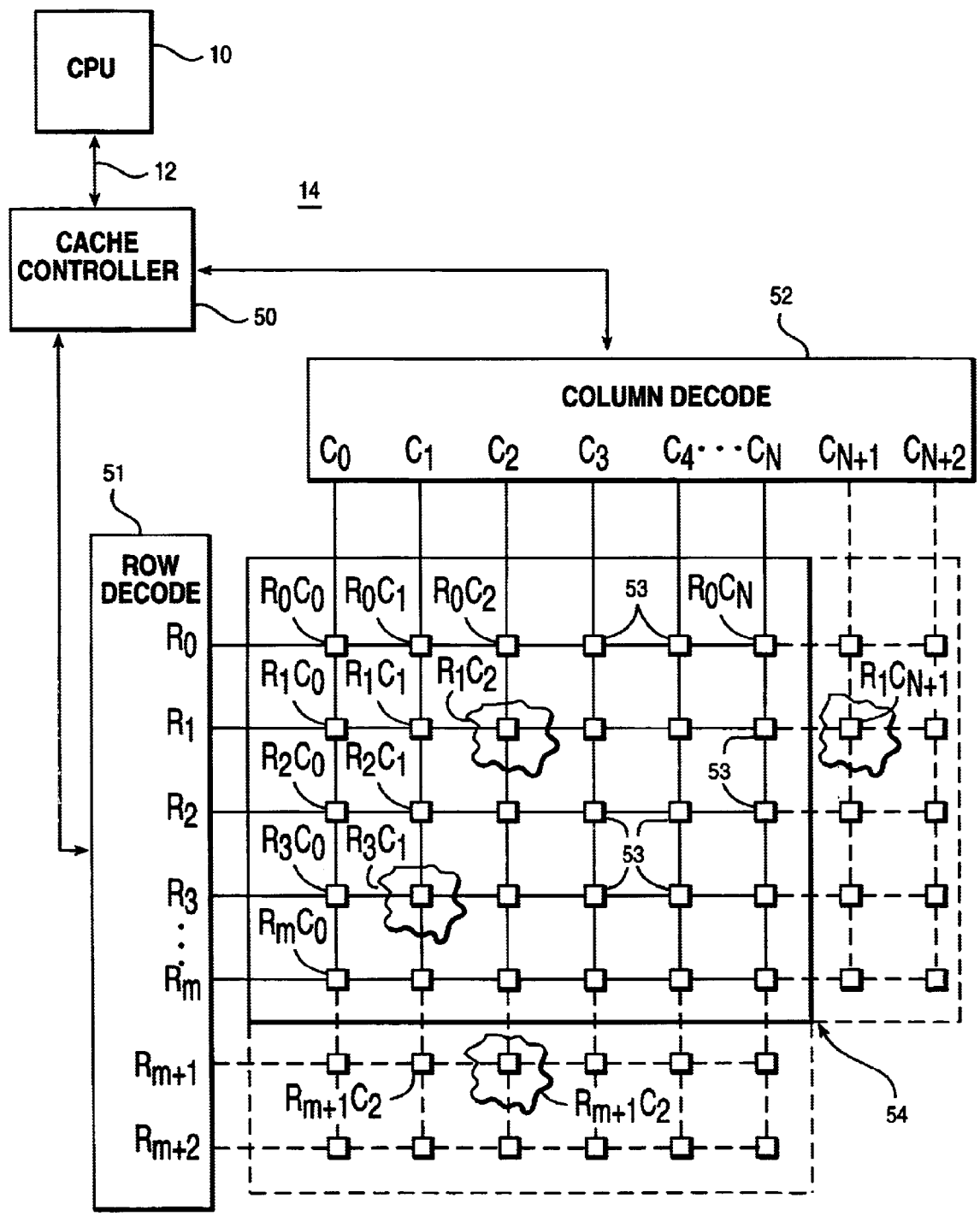
FIG. 2 is another block diagram of a prior art cache redundancy system to be contrasted with the buffer entry redundancy of the present invention.

Referring to FIG. 2 a block diagram is provided that illustrates an example of redundancy as used in a cache memory system. Traditional cache redundancy schemes rely on the index-based decoder circuitry to steer around bad rows/columns in the cache. The instruction buffers are used in a different manner, as they are accessed by a CAM-based mechanism and is distinguished from the traditional cache redundancy scheme. Bus 12 connects central processing unit 10 to a cache controller 50 which, for the purposes of this description is considered as included in RAM 14 shown in FIG. 1. Cache controller 50 includes a directory, associated tags and comparator that determine, among other things, when data is present in a cache memory array 54. That is, cache controller 50 determines whether a cache "hit" (data is present in the cache) or "miss" (data is not present in the cache) occurs. Further, cache controller 50 will control all accesses to cache memory array 54 by CPU 10 or another bus master device connected to system bus 12. Cache accesses will include read operations which retrieve data from array 54 that is to be processed and write operations that place data into the cache for future use.

Cache memory array 54 is depicted as an array of storage elements 53 which maintain the state of a binary value, i.e. a logical 1 (voltage) or a logical 0 (ground, or reference potential). Various types of circuits can be used to store these values, including two inverters each having their outputs connected to the input of the other inverter, capacitors that store a charge and maintain a voltage thereacross, or the like. These storage elements store a bit of data and are configured in an array of multiples rows and columns. The rows of storage elements will combine to form data bytes, words, double words, quad words, and the like. Each bit of data in a row is accessed by identifying its position in the array through a row access identifier and column access identifier. For purposes of explanation, each column position may be C0, C1, C2, C3 . . . Cn and each row position may be R0, R1, R2, R3 . . . Rm. Therefore, each storage element 53 will have a defined location in the array 54. For example, the leftmost storage element in the top row will be at location R0C0 while the storage element in the second column from the left in the third row from the top will be at R2C1, and so forth. It should be noted that FIG. 2 shows an array with a variable number of columns and rows since the size of cache arrays used can vary greatly.

To obtain data from the cache memory, CPU 10 will send a read request, or the like, to cache controller 50 including an address corresponding to the requested data. Cache controller 50 must then determine the physical location in array 54 where the requested data is located. A decoding operation then occurs wherein the read request is decoded by row decode unit 51 and column decode unit 52 to determine the coordinates in array 54 where the requested data is located.

For example, when CPU 10 requires a certain byte of data, it may request the byte stored at, for example, the storage elements located in array 54 at locations R1C0, R1C1 . . . R1C7 to obtain this information. In order to obtain this information, row decode unit 51 determined from the read request that the requested byte was somewhere in row 1, and column decode 52 determined that the byte was located in the first 8 columns of the array, i.e. columns 0–7. Combining this information it can be seen that the requested byte is in the first 8 columns of the second row of array 54.

However, during manufacturing of the integrated circuit device which includes array 54, defects often occur that can cause storage elements 53 not to function properly. To account for this manufacturability problem redundant rows and columns of storage elements are often included in a cache memory array 54.

FIG. 2 shows two additional columns (n+1, n+2) and two additional rows (m+1, m+2) included for redundancy. Of course, the number of extra columns and rows can vary depending on such factors as the size of the cache, implementation, manufacturing process, and the like.

Continuing with the previous example, if one or more of the storage elements 53 have tested "bad" during manufacturing testing, then a storage element from one of the redundant columns and/or rows must be used. For purposes of discussion, it is assumed that the storage element in the third column of the second row is bad, i.e. R1C2. Thus, a redundant, or spare storage element will need to be utilized to store the bit of information that would be present at this location. At spare storage element, Rm+1, C2 could be used to store this data. Thus, every time a transaction is issued from CPU 10 (or another busmaster device that attempts to access the storage element at R1C2) row decode logic 51 will cause the transaction address to be interpreted as row Rm+1 for the bit of data that would have been stored at R1C2. That is, the transaction address will be decoded to include Rm+1, C2 on each occasion when the storage element 53 at location R1C2 is called for by the transaction. It should be noted that the system will continually attempt to access location R1C2 and each time, row decode logic 51 will have to map the request to the redundant location, Rm+1, C2.

This increased cycle time for a cache access will also occur when column redundancy is used. For example, if the spare storage element at R1, Cn+1 is used to store the bit of data that would have been located at R1C2, then column decode 52 will have to decode every access attempt to row R1, C0–C7 to substitute R1, Cn+1 for R1C2. Again an unacceptably high increase in cycle time will occur since the decode logic must interpret all cache access transaction to actually include the redundant location, i.e. R1, Cn+1. It also should be noted that attempts to access storage elements at a given cache location will occur very frequently and cause the decode logic to direct the transaction to the "good" storage elements for each attempt. Thus, the performance is continually impacted for each attempt to a particular storage element.

It can be seen that this continuous substitution will cause a significant amount of cycle time to be added to the cache access time for every attempt to access data that is logically stored to a "bad" storage element. Further, those skilled in the art will understand that while this type of redundancy may be acceptable for cache access, it is totally unacceptable to introduce this additional cycle time into the critical path of a microprocessor. Thus, for this and other reasons, continual re-decoding of cache access attempts to use redundant rows/columns in a cache array is not a viable solution for providing redundancy for data storage devices, e.g. buffers, registers and the like, which are in the critical path of a microprocessor.

Figure 3:
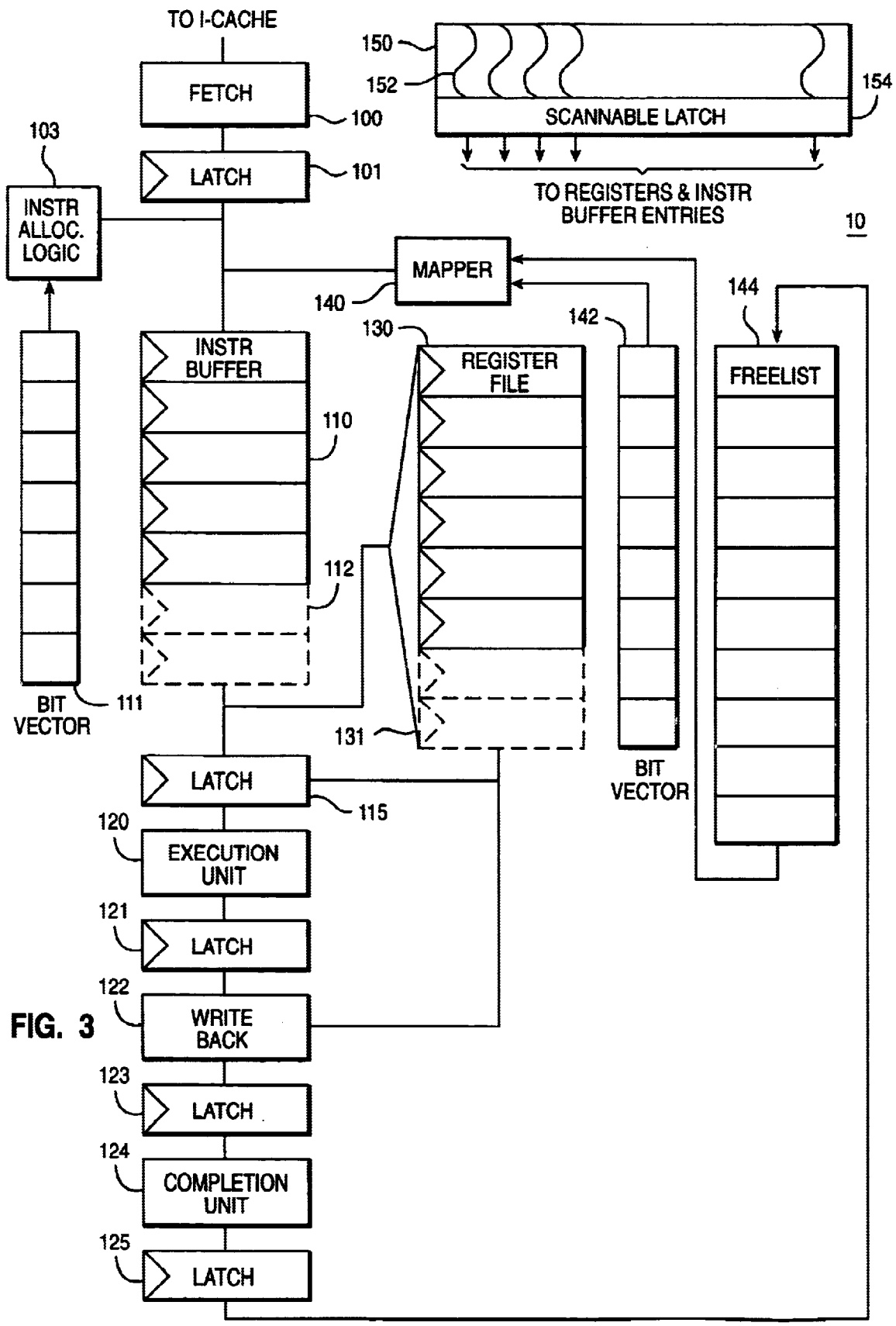
FIG. 3 represents a first preferred embodiment showing the elements of a microprocessor which implements the redundant instruction buffer entry scheme of the present invention.

Referring to FIG. 3, a block diagram of a microprocessor 11 that is capable of implementing the novel redundancy scheme of the present invention is shown. The term microprocessor as used herein will refer to the basic instruction processing and execution unit(s) and can be considered a subset of a CPU which may include additional data processing functions, e.g. I/O. Register renaming is a technique that is relatively common in many of today's speculative, out of order microprocessors. For example, the PowerPC 604 microprocessor (commercially available from IBM), as well as the Pentium II microprocessor from the Intel Corp. are examples of processors that utilize register renaming.

Basically, register renaming operates to build operand data into a mapper, that is a portion of the overall renaming logic. The mapper then keeps track of the logical register set and its correspondence to the physical register file. For example, a microprocessor may have 32 architected registers in the general purpose register (GPR) file, each of which is 32 bits wide, and twelve 32 bit rename registers. These registers make up the logical general purpose register set for this processor. Thus, the base line specification for this processor calls for 32 architecturally defined general purpose registers and 12 rename registers. This number of registers will be needed for this particular microprocessor to meet its intended design criteria. It can be seen that for this implementation 44 physical registers will be needed to account for the GPRs and rename registers. Additionally, a microprocessor design may also have a baseline specification which calls a certain number of instruction buffer entries.

However, as smaller line widths become more and more prevalent, manufacturing yield is likely to decrease and place greater importance on redundancy techniques. Thus with no redundancy mechanism, conventional designs must rely on manufacturing processes to ensure that 100% of the physical registers and buffer entries are functional in order to meet the design specification. Therefore, it can be seen that an advantage is provided if a number of registers and buffer entries are supplied and managed to compensate for any entries that test bad during post manufacturing testing. In accordance with the present invention a set of physical registers and instruction buffer entries are provided that will be greater than the number of these elements required by the baseline specification. Mapper 140 will operate to control the allocation of physical registers for use as either architected or rename registers in accordance with the microprocessor design specification, while instruction allocation logic 103 will control the allocation of instruction buffer entries for use by instructions waiting for their operands to develop. This will ensure that a sufficient number of registers and instruction buffer entries are provided in accordance with the microprocessor design specification.

Therefore, it would be advantageous to be able to include a number of extra instruction buffer entries to compensate for any entries that test bad during post manufacturing testing.

More particularly, modern microprocessors often include instruction buffers in the dispatch stage that provide a storage location for the instructions to wait while their operands develop. Instruction buffer allocation logic is provided that determines when a fetched instruction can be provided to one of the entries in the instruction buffer. There may be as many as 36 or more entries in the instruction buffer, each being approximately 128 bits wide in order to accommodate all of the op codes, target and destination operand addresses, control bits and other information. Thus, a design specification may call for 12, 36 or more buffer entries for a particular microprocessor to meet its baseline specification. Again, with smaller line geometries occurring with greater frequency, manufacturing yield is very important. Therefore, it would be advantageous to be able to include a number of extra buffer entries to compensate for any entries that may test bad during post manufacturing testing.

Referring again to FIG. 3, a fetch unit 100 is shown that will retrieve the microprocessor instructions to be executed from a data cache, or the like (not shown). The fetched instructions are then latched into latch 101 prior to entering the decode stage. Instruction buffer 110 is then provided to store the instructions during the decode process and prior to their dispatch to the microprocessor execution units. It can be seen that instruction buffer 110 includes buffer entries 113 and multiple redundant entries 112, which will be discussed in greater detail below in conjunction with FIG. 7.

Further, bit vector 111 is shown in FIG. 3 which is used to provide an indication of the state of each entry 113 in buffer 110. That is, a bit is provided which corresponds to each entry 113 to indicate whether that entry was tested "good". More particularly, a manufacturing test can be performed which will determine if the entry will store the correct instructions and data. If so, in this preferred embodiment, the corresponding bit will be a logical 0, while an entry which tests bad will be designated by the corresponding bit in vector 111 by a logical 1. Of course, those skilled in the art will understand how a logical "1" could be used to designate "good" bits with a logical "0" corresponding to bits which test "bad".

Manufacturing tests are well known and will not be described in detail herein. Basically, one type of test logic that may be used in conjunction with the present invention generates a pattern of binary values (1's and 0's) and write the pattern to the storage location being tested. The pattern is then read back and compared to the generated pattern. If the retrieved pattern matches the generated pattern, then the storage location will be considered as having a functional operational status, i.e. "good" and the logical 0 will remain in the corresponding bit. However, if the patterns do not match, the corresponding bit will be set to a logical 1, indicating that the entry has a defective operational status, i.e. tested "bad".

Instruction allocation logic 103 is also shown in FIG. 3 and is used by microprocessor 11 to assign the fetched instructions to one of the multiple entries 113 in instruction buffer 110. Once the bit vector is generated, it is provided to instruction allocation logic 103. Logic 103 can then use various mechanisms for designating which entries are functional and which are defective. For example, a "manufactured good" bit in the instruction buffer entry itself could be set in accordance with the indicator in bit vector 111. Of course other methods could be used to designate the operational status of the various entries, such as using a tag, pointer, mapping table, link, flag, or the like. In this manner, the fetched instruction can be allocated to only those entries 113 which have tested "good" as indicated by, for example, a corresponding "0" in bit vector 111. This enables spare, or redundant entries 112 to be considered for use by allocation logic 103. Therefore, should one of the entries 113 that make up the microprocessor baseline specification test "defective", then allocation logic 103 can assign the fetched instruction to a redundant entry 112 which has tested "functional". Thus, redundant instruction buffer entries can be introduced to the microprocessor design at a critical path without any performance degradation.

Continuing with FIG. 3, register file 130 is shown as being coupled with instruction buffer 110, latch 115 and write back unit 122. Redundant registers are also included and shown by reference numeral 131. For purposes of this discussion, it should be understood that register file 130 will include both rename registers and general purpose registers. While a specific number of registers are shown in FIG. 3, those skilled in the art will understand that many different configurations of register files are possible, including general purpose registers files including 80 or more logical registers.

Mapper 140 is also shown and includes register allocate/deallocate logic that matches instructions with available registers in register file 130. Freelist 144 is provided and operates in conjunction with the register allocate/deallocate logic of mapper 140 and maintains a list of registers that are available for use, i.e. to be matched with a fetched instruction.

Once fetched and decoded, the instructions are provided to latch 115 in the execute stage. During the decode stage it is determined what type of instruction is to be executed, which will govern whether the instruction should be provided to a particular execution unit. For example, modern microprocessors normally include multiple execution units, such as an integer unit, floating point unit, load/store unit, branch processing unit, or the like. In this manner, a floating point ADD instruction will be provided to the floating point unit, a COMPARE instruction will normally be provided to the integer unit, and so forth. These instructions will normally require data to complete their operation. This data will usually be provided from the register file 130, after having been placed in a particular register by execution of a previous instructions or during the write back stage.

After execution of the instruction by unit 120, the results are placed in latch 121 for entry to the write back stage. Write back occurs when a result is written from the rename registers into the architectural registers (GPRs). Results are written back at completion time or are moved into the write-back buffer. Write back unit 122 will provide results back to the designated rename registers in register file 130 so that these results can then be used as data operands for subsequent instructions.

The complete stage maintains the correct architectural machine state. Essentially the complete stage ensures that executed instructions are retired in the same order in which they were dispatched. Modern microprocessors are generally capable of executing instructions out of order. However, once executed they are placed back in their sequential order to maintain program consistency. A completion unit 124 is provided that generally includes a completion buffer and associated logic that compares the program number of the results of the executed instructions and places the results in sequential order in the buffer, prior to the results being written back and committed to the architecture. Latch 123 is used to store the results prior to entering the complete stage. Subsequent to completion, the register allocated to the instruction that was executed is released and added to freelist 144 as one that is available for allocation to another instruction being processed. The register address latched into latch 125 prior to being added to freelist 144. Freelist 144 receives the location of available physical registers from completion unit 124 after the results from these registers are committed to the architecture. A first-in-first-out algorithm, or the like is then be used to maintain the registers available for allocation in freelist 144. When the available registers are ready to be allocated their address is provided to mapper 140 for assignment to the next instruction being dispatched as a destination register for associated operand data.

Modern microprocessors may avoid contention for a given register location by providing rename registers for storing instruction results before the completion unit commits them to the architected register(s), i.e. the 32 general purpose registers. When the dispatch unit dispatches an instruction to its execution unit, it allocates a rename register for the results of that instruction. The dispatch unit also provides a tag to the execution unit identifying the result that should be used as the operand. When the proper result is returned to the rename buffer it is latched into the reservation station (buffer between dispatch and execute stages). When all operands are available in the reservation station, execution can begin. The completion unit does not transfer instruction results from the rename registers to the architected registers until any preceding speculative branch conditions in the completion queue are resolved and the instruction itself is retired from the completion queue without exceptions. If a speculatively executed branch is found to have been incorrectly predicted, the speculatively executed instructions following the branch are flushed from the completion queue and the results of those instructions are flushed from the rename registers.

For an in depth discussion of register renaming see chapter 7.5 of Advanced Computer Architectures: A Design Space Approach, Sima, Fountain, Kacsuk, Addison-Wesley Longman, 1997, the entire test of which is hereby incorporated by reference.

In accordance with the present invention a mechanism is provided for determining which ones, if any, of the registers in register file 130 test bad during manufacturing testing. Referring again to FIG. 3, in a preferred embodiment, electronic fuses 152 are wired to a test port 150 and connected to scannable latch 154. During manufacturing (or other) testing if a register in file 130 tests bad, then the corresponding fuse can be blown and an associated bit set in scannable latch 154. Thus, an indicator is provided for each register that is determined to be defective during testing. Of course, there are many different ways that the indicator bit can be created. For example, during power on self test (POST) it can be determined if each register is operating correctly. Also, other test mechanisms are available which can be used to generate bit vector 142 or provide another type of indicator regarding the operability of a register. For example, a built in self test (BIST) routine can be used to determine which ones of the registers in register file 130 are bad and set a corresponding bit that can be used as an indicator. That is, data can be written to the register(s) being tested and then checked for accuracy when it is read back. If any discrepancies are found in a particular register, an associated bit can be set to identify that particular register as testing bad. Once the registers that test bad are identified, a bit vector 142 can be generated having entries that correspond to each register in register file 130. This information can then be provided to mapper 140 and used to allocate only functional registers in file 130 to instructions during dispatch such that the registers which tested bad are never considered for allocation.

Thus, it can be seen that the present invention essentially operates to build a list of registers which are available for allocation. Once this list-is built, there are no additional re-decoding activities, register reassignment procedures, or the like to be implemented beyond the register allocation that normally occurs during renaming operations.

Figure 4:
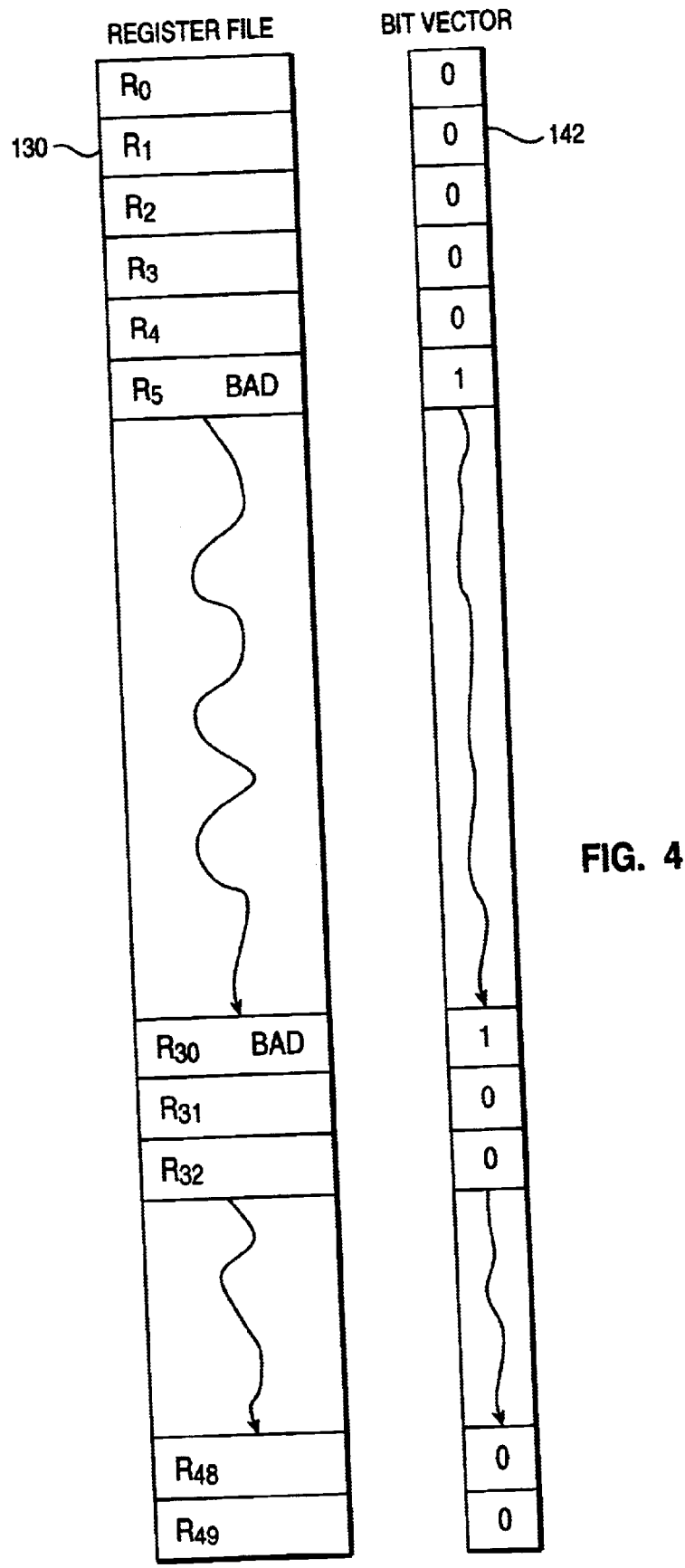
FIG. 4 shows a physical register pool that is defined as the architected register file for a particular microprocessor.

Referring to FIG. 4, as well as FIG. 3, an example of register renaming will now be provided. For purposes of this example the following instruction sequence will be used:

(1) ADD1 R31 <R0, R1

(2) ADD2 R20 <R31, R0

(3) ADD3 R31 <R2, R3

The first instruction adds the contents of register R0 and register R1 and places the result in register R31. When the ADD1 instruction is dispatched, mapper 140 will select the next available physical register from freelist 144 and map the logical destination register R31 to this physical register. For the purposes of this example, it will be assumed that the allocated physical register is R49 from FIG. 5. Normally, a mapping table is set up to track the allocation of physical registers to logical registers. For more details see FIGS. 7.52 and 7.53 on page 252 of the Advanced Computer Architectures text. Next, the ADD2 instruction places the sum of registers R31 (R49 physical register) and R0 in register R20. Thus, it can be seen that the operand data from instruction (1) is still being utilized such that physical register R49 remains allocated as the destination register of instruction (1). It should be noted that there are normally two conditions which must be met in order for a register to be deallocated. First, the assigned physical register must have another value written to it, i.e. the data that was the result of the assigned instruction is not longer present in the register; and second, there are no previous instructions that are using that value, i.e. no previously dispatched instructions are using the data stored in the registers by the assigned instruction. In this manner the allocate logic uses the assigned register for the life of the value originally placed therein. The register is allocated when first needed as a target destination for holding intermediate results and deallocated when the logical (architected) register is reused, i.e. a different value for another instruction is stored to the same logical register.

In the context of the present example, physical register R49 is allocated by the dispatch unit as the destination register for the operand data of instruction (1). The contents of physical register R49 (linked to logical register R31) are then used by instruction (2). Instruction ADD3 then places the results of the addition of registers R2 and R3 into logical register R31 (physical register R49). Thus, instruction (3) places a new value in logical register R31 such that one of the conditions for deallocation is met. Further, since there is no previous unexecuted instruction that was using the value originally stored by instruction (1), physical register R49 is deallocated and returned to freelist 144. Also referring to instruction (3), mapper 140 will allocate a new register (for example R48) from register pool 130 and assign it as the destination register for the results of this ADD instruction. In this manner, physical registers in register pool 130 are allocated and deallocated by mapper 140 such that register renaming is implemented. Of course, only a very basic example has been provided to aid in the understanding of register renaming as used in a modern microprocessor. In reality each of the instructions (2) and (3) will also have an assigned physical register from freelist 144, and the number and types of instructions will be very complex and diverse. Further, while the present invention is being described in the context of a general purpose register file, it should be understood that the scope of the present invention contemplates use in a floating point register file, condition register file or any set of physical registers which are mapped to logical registers.

As can be seen from the previous discussion, register renaming is a mechanism which tracks the usage of various physical registers and maps this usage to a logical, or architected register that is recognized by the software. In accordance with the present invention, the register renaming logic is modified to prevent any physical registers in the microprocessor from being used which test bad during manufacturing testing, POST and/or BIST. More particularly, the register set 130 shown in FIG. 5 includes 50 (R0–R49) physical registers. For example a microprocessor may have 32 registers to be used as the architected general purpose register file 133 of FIG. 4 and 12 registers for use as the rename register file 132. Of course, many types of microprocessors are available with different GPR and renaming register configurations.

Returning to FIG. 3, the operation of the present invention will now be described. In a first preferred embodiment, fuses 152 in fuse block 150 will be used as the mechanism to build bit vector 111. Once a particular lot of microprocessors 11 is fabricated they will undergo testing to determine whether the functional units included therein are operating normally. As noted above, with the smaller line geometries (e.g. 0.18 and even 0.13 micron line width) the yield may be lower than needed to economically manufacture the processor. Therefore, the critical elements, such as instruction buffer 110 are tested to ensure they will accurately store the desired binary value which represent an instruction and corresponding data to be processed. If it is determined that one of the any of the entries 113, 112 in buffer 110 are bad, a corresponding fuse 152 is blown and an associated bit is set in scannable latch 154. The information in latch 154 is then used to build vector bit 111.

More particularly, from FIG. 5, it can be seen that, for the purpose of this example, entries (3) and (10) are noted as having tested bad and a corresponding bit in vector 111 is set to logical 1. FIG. 3 then shows how bit vector 111 is input to instruction allocation logic 103 where a mapping table included therein is updated. By updating instruction allocation logic 103 with the bit vector, the present invention ensures that entries (3) and (10) will never be used as the destination buffer entry of an instruction being processed in the dispatch stage. This allows redundant, or spare entries to be provided which can be used in place of the defective entries (3) and (10). For example, in the case of a representative microprocessor, 12 entries are needed for the system to meet its baseline specification. As shown in FIG. 5, four 4 spare entries are provided giving a total of 16. Thus, since spare entry (13) tested "bad", allocation logic 103 could utilize entries (14) and (15) in place of entries (3) and (10) to provide the actual buffer entries needed to meet the system specification. Also, bit vector 111 is input to instruction allocation logic 103 only once such that only "good" entries are considered to receive instructions in the dispatch stage and there is no increased cycle time in the critical path of the microprocessor. Of course, a 12 entry instruction buffer with 4 spare entries is provided herein to assist in the explanation of the present invention and should not be construed as a limitation. As such, other sizes and configurations of instruction buffers are contemplated by the scope of the present invention.

For example, referring to FIG. 5, when an instruction is ready to be provided to an instruction buffer entry, allocation logic 103 will consider only entries (1), (2), (4)–(9), (11), (12) and (14)–(16) as candidates for receiving the instruction. It should be noted in this preferred embodiment that instructions are essentially broadcast to buffer 110 such that the next available entry having its valid bit (V) set and which corresponds to a bit vector field that indicates the entry has tested "good" will receive the instruction.

In accordance with the present invention, once allocation logic 103 is updated with bit vector 111, there will be no additional decode function required to ensure that instructions are assigned to only entries which are operational. Therefore, no increased cycle time is associated with use of the present invention. That is, in a first preferred embodiment existing instruction allocation logic is used by the present invention as a mechanism to track and control the availability and status of entries in instruction buffer 110, as shown in FIG. 5. Thus, instruction allocation is used non-conventional manner to prevent those entries in buffer 110 that test bad from ever being used. Further, there is no impact on cycle time performance during decode/dispatch since the instruction allocation logic is permanently updated at initialization with those entries in instruction buffer 110 that are defective. In this manner a mapping table or other mechanism is used to relate, or establish a link between allocation logic 103 and the "good" instruction buffer entries such that only functional entries will be considered for allocation.

Another preferred embodiment of the present invention will now be described in conjunction with FIG. 6 which shows a detailed view of the information included in an entry 113 of buffer 110. As noted previously, there is a trend in modern microprocessor design towards data flow machines wherein each instruction is processed substantially autonomously. That is, the microprocessor determines what is needed in the way of operand data, or the like to execute each individual instruction. In furtherance of this, instruction buffer 110 includes various control logic that is associated with each entry 113 and 112. This data flow oriented processing allows instructions to be processed more independently and minimizes the amount of pipelining that occurs.

As noted previously, instruction buffer 110 is structured as a content addressable memory (CAM) which allows specific information to be placed in, and retrieved from individual instruction buffer entries. More particularly, a CAM is an associative memory where a part of the data itself is stored in the memory. To read information from the CAM, a section of the information in question is input into the CAM (instruction buffer 110 in the present invention) and compared with a section of information already stored therein. If a match occurs, the CAM returns the information associated with that section of information. In the context of the instruction buffer 110 of the present invention, allocation logic 103 will essentially broadcast information to each entry 113, 112. Each entry 113 and 112 has an associated comparator and if a match occurs the information is then used to update the matching entry. Thus, when specific operand data is returned from the data cache, registers, or the like, it is broadcast from logic 103 to each entry in buffer 110 and matched with the appropriate instruction.

The CAM structure of the instruction buffer not only allows information to be selectively provided to individual buffer entries, but also provides for the individual retrieval of information from a single entry.

Figure 6:
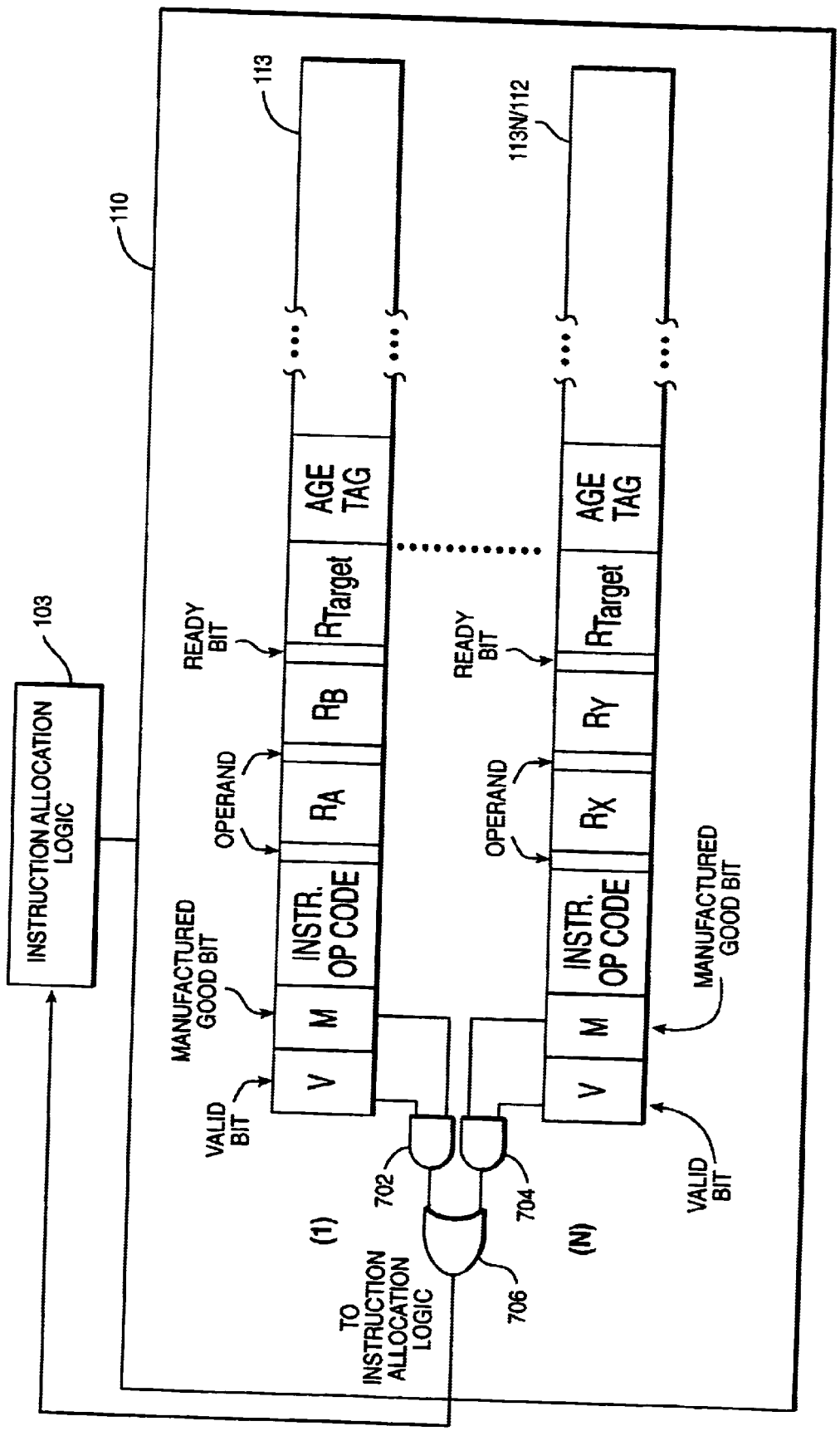
FIG. 6 illustrates another preferred embodiment of the present invention having an instruction buffer entry including a manufactured good bit in accordance with the present invention.

FIG. 6 illustrates the types of information that may be included in an instruction buffer entry 113. It should be noted that buffer 110 will include multiple entries 113 to 113n, as shown in FIG. 6, and in accordance with the present invention, spare entries 112 will also be provided that are structured identically to entries 113.

Entries 113, 112 will include a great deal of digital information may be on the order of 128 bits wide. For example, the instruction operation code (op code) will be included that identifies the type of instruction to be executed, e.g. ADD, COMPARE, LOAD. Operand data register address fields, such as Ra, Rb are included where various data to be manipulated by the instruction is stored. A target register address is provided that will indicate the location where the results of the data manipulation is to be stored. Each of these register address fields has an associated "operand ready" bit to indicate whether the data is available to be manipulated by the instruction and/or the results ready to be stored in the target register. Additionally, valid bit "V" is provided that indicates when the entry is available for use by a new instruction awaiting execution. Further, an age tag is provided to indicate, for instruction ordering purposes, how long an instruction has been in buffer 110. While these fields have been described to aid in the understanding of the present invention there are many other fields typically included in an instruction buffer entry.

In accordance with the present invention, manufactured good bit "M" is provided in each buffer entry 113, 112. This bit is set in response to one of the manufacturing or self tests (POST, BIST) that are run subsequent to the fabrication of the integrated circuit. If the test results show that a particular entry 113, 112 returns incorrect data, then that entry is considered "bad" and the M bit is set accordingly. For the purposes of describing the present invention a logical "1" will indicate that the entry has been tested "good" and a logical "0" will indicate that the entry is defective.

Allocation control logic 103 normally looks at the valid bit "V" for each buffer entry to determine when various entries are available to receive a new instruction for processing. Again, for the purpose of describing the present invention a valid bit set to logical "1" will indicate that the entry is available for an awaiting instruction and a logical "0" means the entry is being used, or otherwise unavailable. Additional logic is provided to associate the manufacture good bit and valid bit such that if an entry has been tested good and it is available to receive a new microprocessor instruction, then a control signal will be provided to allocation logic 103 such that the awaiting instruction is then provided to buffer 110.

One example of this additional logic could be the use of AND gate 702 which determines when both the valid bit and the manufactured good bit indicate that the entry can receive an instruction, and the entry has tested good. For this example, each entry in the buffer will include an AND gate that uses the valid bit and manufactured good bit as inputs. More specifically, the remaining entries 113n and spare entries 112 will include an AND gate shown by reference numeral 704. The output of the AND gates are then provided as inputs to an OR gate 706 which then provides the control signal back to allocation control logic 103. In this case, when both the valid bit and manufactured good bits are set (logical 1), then a logical 1 is provided to OR gate 706. In this manner, when even a single buffer entry is available for use and has tested good, an indication (logical 1 in this example) will be provided to allocation logic 103 from OR gate 706 that indicates at least one entry is available and the awaiting instruction is then broadcast to instruction buffer 110. By virtue of its CAM structure the broadcast instruction will then be received by the first individual entry that is ready.

Of course there are many other logic configurations that could be used to communicate the availability of at least one buffer entry to allocation logic 103 and the present description is provided by way of example and not limitation.

Therefore, it can be seen that multiple redundant, or spare entries 112 can be provided in the instruction buffer 110 such that those entries 113 or 112 that test as having been manufactured bad will not indicate their availability and never receive an instruction. Conversely, those entries which test as having a functional status will allow allocation control logic to broadcast an awaiting instruction to buffer 110 wherein only the entries that test good will be used and the bad entries are entirely avoided.

Those skilled in the art will appreciate that this mechanism will allow spare entries to be utilized transparently to the microprocessor operation such that redundancy can be built into the design and ensure that the number of available instruction buffer entries for the baseline microprocessor specification are provided.

An additional advantage of the present invention is realized in the area of verification and functional testing. It can be seen that bit vector 111 could be generated by test/verification control logic to intentionally label various ones of the entries in buffer 110 as "bad". Accordingly, the allocation logic will not use those entries and system operation/performance can be verified with only a predefined number of instruction buffer entries being operational. The bit vector can then be altered to test various buffer entry configurations where different ones of the entries in buffer 110 may be designated as functional or defective. Benchmark tests can then be run to determine system performance when different register configurations are set. Further, in accordance with another preferred embodiment, for testing purposes the "manufactured good" bit (M) can be set to indicate that a particular buffer entry is defective. Tests can then be performed to verify system performance under various conditions where certain ones of the instruction buffer entries are designated as functional or defective.

Although certain preferred embodiments have been shown and described, it should be understood that many changes and modifications may be made therein without departing from the scope of the appended claims.

What is claimed is:

1. A data processing system including a microprocessor, comprising:
    an instruction buffer including a predetermined number of entries for storing at least one instruction being processed by said microprocessor,
    means for identifying a functional operational status or a defective operational status of each of said predetermined number of entries; and
    allocation control logic for preventing said instructions from being allocated to entries having said defective functional status.

2. A data processing system according to claim 1 wherein said means for identifying comprises a test mechanism that determines whether said predetermined number of entries have said functional operational status or said defective operational status.

3. A data processing system according to claim 2 wherein said allocation control logic comprises means for causing said instruction to be transferred to said instruction buffer when at least one of said entries has said functional operational status.

4. A data processing system according to claim 3 wherein said means for identifying further comprises:
   a plurality of indicators, corresponding to each of said predetermined number of entries, for storing said operational status relative to each of said predetermined number of entries; and
   means for providing said plurality of indicators to said allocation control logic.

5. A data processing system according to claim 4 wherein said plurality of indicators comprises a bit vector having a plurality of fields each having one of said plurality of indicators stored therein which correspond to each of said predetermined number of entries.

6. A data processing system according to claim 5 wherein said means for identifying further comprises a set of fuses each corresponding to one of said plurality of fields for causing a value in said plurality of fields to be set in accordance with the operational status of a corresponding one of each of said predetermined number of entries.

7. A data processing system according to claim 6 wherein said predetermined number of entries exceeds a base number of entries, having said functional status, used by said microprocessor.

8. A data processing system according to claim 7 wherein said predetermined number of entries less a number of said entries having said defective status is greater than or equal to said base number of entries.

9. A method of providing redundant instruction buffer entries in an instruction buffer in a microprocessor included in a data processing system, comprising the steps of:
   providing an instruction buffer including a predetermined number of entries for storing at least one instruction being processed by said microprocessor,
   identifying an operational status of each of said predetermined number of entries as one of a functional operational status and a defective operational status; and
   preventing, by allocation control logic, said instructions from being allocated to said defective entries.

10. A method according to claim 9 wherein said step of identifying comprises the step of determining by a test mechanism whether said predetermined number of entries have a functional operational status or a defective operational status.

11. A method according to claim 10 wherein said step of preventing comprises the step of causing said instruction to be transferred to said instruction buffer when at least one of said entries has a functional operational status.

12. A method according to claim 11 wherein said step of identifying further comprises the steps of:
   storing by a plurality of indicators corresponding to each of said predetermined number of entries, said operational status relative to each of said predetermined number of entries; and
   providing said plurality of indicators to said allocation control logic.

13. A method according to claim 12 wherein said step of storing comprises the step of generating a bit vector having a plurality of fields each having one of said plurality of indicators stored therein which correspond to each of said predetermined number of entries.

14. A method according to claim 13 wherein said step of identifying further comprises activating at least one fuse, which corresponds to one of said plurality of fields, to cause a value in said plurality of fields to be set in accordance with the operational status of a corresponding one of each of said predetermined number of entries.

15. A method according to claim 14 wherein said predetermined number of entries exceeds a base number of entries, having said functional status, used by said microprocessor.

16. A method according to claim 15 wherein said predetermined number of entries less a number of said entries having said defective status is greater than or equal to said base number of entries.

17. A microprocessor having redundant instruction buffer entries, comprising:
   a predetermined number of entries, including said redundant entries, for storing instructions being processed by said microprocessor;
   means for identifying an operational status of each of said predetermined number of entries as one of a functional operational status and a defective operational status; and
   allocation control logic that prevents said instructions from being allocated to said defective entries.

18. A microprocessor according to claim 17 wherein said means for identifying comprises a test mechanism that determines whether said predetermined number of entries have a functional operational status or a defective operational status.

19. A microprocessor according to claim 18 wherein said allocation control logic comprises means for causing said instruction to be transferred to said instruction buffer when at least one of said entries has a functional operational status.

20. A microprocessor according to claim 19 wherein said means for identifying further comprises:
   a plurality of indicators, corresponding to each of said predetermined number of entries, for storing said operational status relative to each of said predetermined number of entries; and
   means for providing said plurality of indicators to said allocation control logic.

21. A microprocessor according to claim 20 wherein said plurality of indicators comprises a bit vector having a plurality of fields each having one of said plurality of indicators stored therein which correspond to each of said predetermined number of entries.

22. A microprocessor according to claim 21 wherein said allocation control logic comprises means for designating said redundant entries having a functional status as available for use by said instructions, and for preventing use of any other of said predetermined entries having a defective status.

23. A microprocessor according to claim 22 wherein said means for identifying further comprises a set of fuses each corresponding to one of said plurality of fields for causing a value in said plurality of fields to be set in accordance with the operational status of a corresponding one of each of said predetermined number of entries.

24. A data processing system, comprising:
   a microprocessor including an instruction buffer having a predetermined number of entries for storing at least one instruction for processing;
   a test mechanism which determines whether each of said predetermined number of entries has a functional operational status or a defective operational status;
   a bit vector having a plurality of fields corresponding to each of said predetermined number of entries, each of said fields having an indicator representative of said operational status relative to each of said predetermined number of entries; and allocation control logic that receives said bit vector and designates specific ones of said predetermined number of entries, having a functional operational status, as available for use by said instructions being processed by said microprocessor;

wherein said predetermined number of entries includes redundant entries such that a sufficient number of entries having a functional operational status will be available for use by said instructions when a portion of said predetermined number of entries have a defective operational status.

25. A data processing system according to claim 24 wherein said test mechanism activates fuses corresponding to one of said plurality of fields and causes said indicator value in said plurality of fields to be set in accordance with the functional operational status or defective operational status of a corresponding one of each of said predetermined number of entries.

26. A data processing system including a microprocessor, comprising:

an instruction buffer including a predetermined number of entries for storing at least one instruction being processed by said microprocessor;

means for identifying an operational status of each of said predetermined number of entries; and allocation control logic for preventing said instructions from being allocated to entries having a particular operational status.

27. A data processing system according to claim 26 wherein said means for identifying comprises a test mechanism that determines whether said predetermined number of entries have said functional operational status or said defective operational status.

28. A data processing system according to claim 27 wherein said predetermined number of entries each comprise at least one indicator to designate the operational status of a corresponding one of said predetermined number of entries.

29. A data processing system according to claim 28 wherein said at least one indicators comprises a bit field set according to a determination by said test mechanism that said entry has a functional operational status or a defective operational status.

30. A data processing system according to claim 29 wherein said predetermined number of entries further comprises entry control logic for determining when at least one of said predetermined number of entries has an indicator designating the corresponding entry as having an operational status.

31. A data processing system according to claim 30 wherein said data processing system further comprises means for providing a control signal from said entry control logic to said allocation control logic wherein only said predetermined number of entries having an operational status are designated as available for use by said at least one instruction.

32. A data processing system according to claim 31 wherein said predetermined number of entries includes redundant entries such that a sufficient number of entries having a functional operational status will be available for use by said instructions when a portion of said predetermined number of entries have a defective operational status.

33. A method of providing redundant entries in a microprocessor instruction buffer, comprising the steps of:

storing at least one instruction being processed by said microprocessor in an instruction buffer including a predetermined number of entries;

identifying an operational status of each of said predetermined number of entries; and preventing, by allocation control logic said instructions from being allocated to entries having a particular operational status.

34. A method according to claim 33 wherein said step of identifying comprises the step of determining, by a test mechanism, whether said predetermined number of entries have said functional operational status or said defective operational status.

35. A method according to claim 34 wherein said predetermined number of entries each comprise at least one indicator to designate the operational status of a corresponding one of said predetermined number of entries.

36. A method according to claim 35 wherein said at least one indicators comprises a bit field set according to a determination by said test mechanism that said entry has a functional operational status or a defective operational status.

37. A method according to claim 36 wherein said method further comprises the steps of:

determining, by entry control logic, when at least one of said predetermined number of entries has an indicator designating the corresponding entry as having an operational status; and providing a control signal from said entry control logic to said allocation control logic wherein only said predetermined number of entries having an operational status are designated as available for use by said at least one instruction.

38. A method according to claim 37 wherein said predetermined number of entries includes redundant entries such that a sufficient number of entries having a functional operational status will be available for use by said instructions when a portion of said predetermined number of entries have a defective operational status.

39. A data processing system, comprising:

a microprocessor including an instruction buffer having a predetermined number of entries for storing at least one instruction for processing and having at least one indicator to designate an operational status of a corresponding one of said predetermined number of entries;

a test mechanism which determines whether each of said predetermined number of entries has a functional operational status or a defective operational status;

a bit field in each of said predetermined number of entries, said bit field including a corresponding one of said indicators set in accordance with a determination by said test mechanism that said entry has a functional operational status or a defective operational status;

entry control logic that determines when at least one of said predetermined number of entries has said functional operational status and is available to receive one of said at least one instructions;

allocation control logic that receives a signal from said entry control logic and accordingly designates specific ones of said predetermined number of entries, as available for use by said instructions being processed by said microprocessor;

wherein said predetermined number of entries includes redundant entries such that a sufficient number of entries having a functional operational status will be available for use by said instructions when a portion of said predetermined number of entries have a defective operational status.

* * * * *